(12) United States Patent
Werner

(10) Patent No.: US 7,963,240 B1
(45) Date of Patent: Jun. 21, 2011

(54) CATAMARAN HAVING TUBULAR AIR SCOOPS

(76) Inventor: Todd C. Werner, Clearwater, FL (US)

( * ) Notice: Subject to any disclaimer, the term of this patent is extended or adjusted under 35 U.S.C. 154(b) by 313 days.

(21) Appl. No.: 12/368,672

(22) Filed: Feb. 10, 2009

(51) Int. Cl.
*B63B 1/00* (2006.01)
*B63B 1/10* (2006.01)
*B63B 1/12* (2006.01)
*B63B 1/16* (2006.01)
*B63B 1/32* (2006.01)

(52) U.S. Cl. ...................... 114/61.1; 114/288

(58) Field of Classification Search .... 114/61.1–61.296, 114/67 A, 288–290; 180/116–126
See application file for complete search history.

(56) References Cited

U.S. PATENT DOCUMENTS

| | | | | |
|---|---|---|---|---|
| 2,900,945 A | * | 8/1959 | Canazzi | 114/288 |
| 3,371,638 A | * | 3/1968 | Beringer | 114/290 |
| 3,937,164 A | * | 2/1976 | Austin | 114/288 |
| 6,397,769 B1 | * | 6/2002 | Bullmer | 114/61.1 |
| 7,487,736 B2 | * | 2/2009 | Daley | 114/271 |

* cited by examiner

*Primary Examiner* — Ajay Vasudeva
(74) *Attorney, Agent, or Firm* — Ronald E. Smith; Smith & Hopen, P.A.

(57) ABSTRACT

A catamaran adapted for high speed travel includes a first and second hull, or vaka, disposed transversely apart from one another and interconnected by an intermediate structure, or aka. First and second elongate air tubes are formed in respective interior sides of the vakas. Each air tube is in open communication with a leading end of the vaka within which it is formed and has a uniform depth from the leading end to the approximate center of gravity of the catamaran. Each air tube depth gradually lessens from the center of gravity to the stern. Both vakas are therefore thickened inwardly toward one another at about the center of gravity to create a gradually increasing constriction in air flow beneath the aka. An exhaust area begins where the constriction begins and extends to the stern.

5 Claims, 5 Drawing Sheets

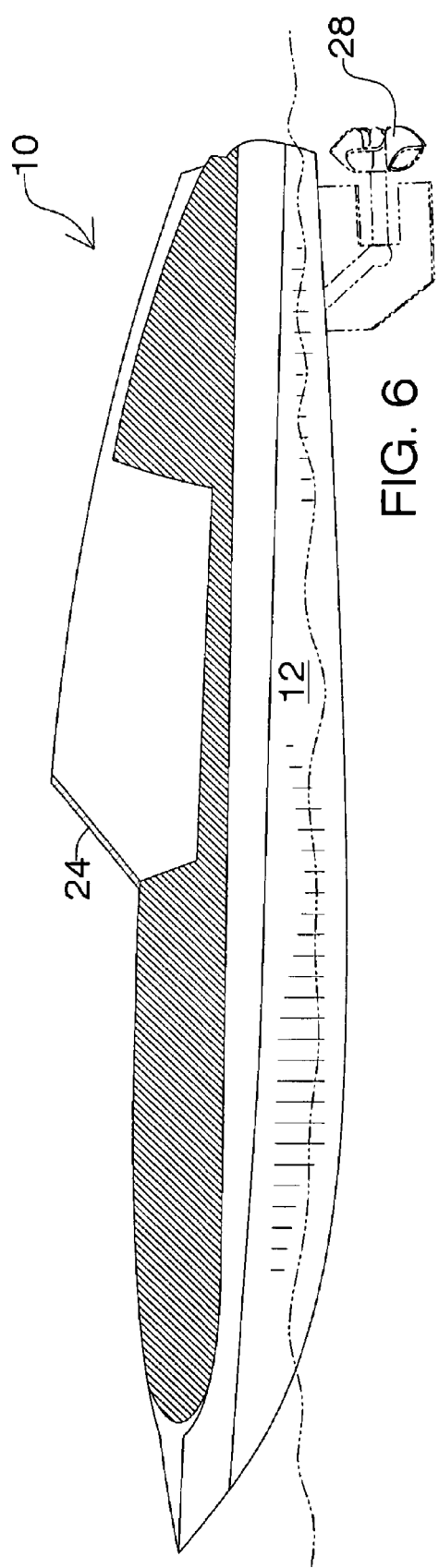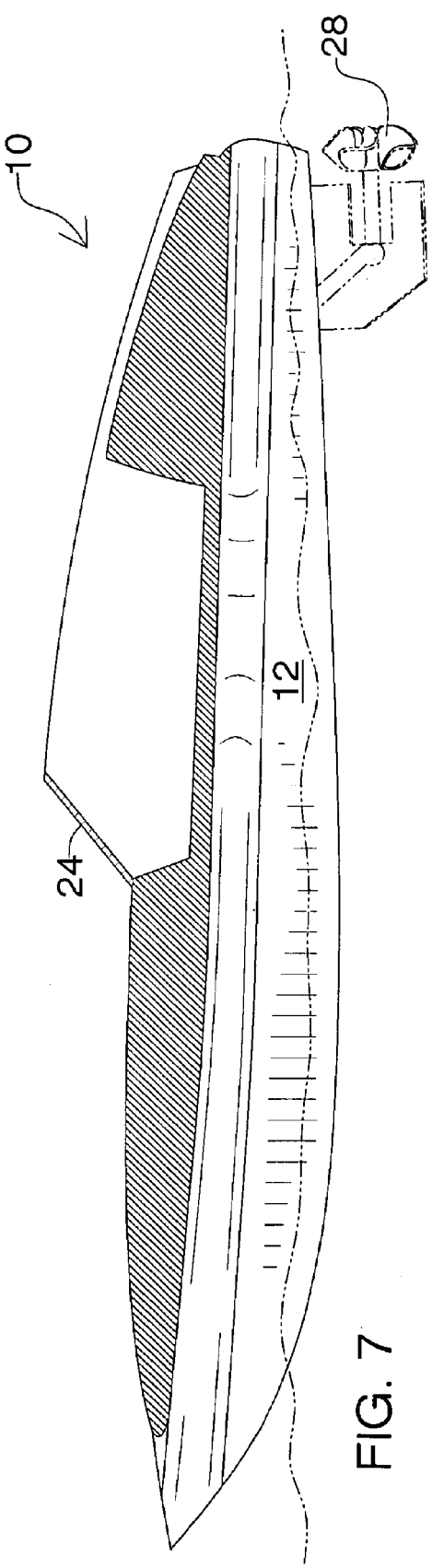

CATAMARAN HAVING TUBULAR AIR SCOOPS

BACKGROUND OF THE INVENTION

1. Field of the Invention

This invention relates, generally, to catamarans. More particularly, it relates to a catamaran having elongate tubular air scoops positioned beneath the deck above the water line.

2. Description of the Prior Art Sponson-Vaka Aka-Top of the Tunnel or Wing

A catamaran is defined in Webster as a twin hulled watercraft with a deck or superstructure interconnecting the hulls. Wikipedia defines a catamaran as a multi-hulled watercraft where each sponson is called a vaka and the top of the tunnel or wing that interconnects the vakas is called the aka.

Catamarans ride on a bubble of air when traveling at high speeds. A ribbon placed on the bow that extends into the cavity below the aka and between the vakas above the water will flow toward the stern at slow speeds. As the speed increases, pressure builds up under the aka. When the speed attains a certain threshold, depending upon the structure and speed of the craft, the ribbon blows out of the air space under the aka and extends in leading relation to the craft.

The forward flowing ribbon is caused by the high air pressure in the tunnel, i.e., the space under the aka. As speed increases, a catamaran rises as the air pressure in the aka rises. A catamaran balances at its center of gravity and the watercraft lifts evenly from the water so that the bow and stern are lifted together.

At relatively low speeds, the vaka provide buoyancy just like the hull of a conventional watercraft. As speed increases, the vaka begin to rise from the water but the bubble of high pressure air in the aka builds up and collapses frequently until a high speed is obtained. The build-up and collapsing of the air bubble in the aka causes the watercraft to buck, kick, and shimmy, creating an uncomfortable ride. When a sufficiently high speed is attained, the vaka rise to the surface of the water and they no longer perform the flotation function provided at lower speeds. The air bubble build-up and collapse pattern ends and the ride becomes smooth. At such high speed, a catamaran can turn without banking; the vaka provide stability instead of buoyancy.

In conventional catamarans, the air bubble build-up and collapse begins at about sixty five miles per hour (65 mph), depending upon the size, design, and weight of the craft, and the smooth ride does not resume until the craft reaches a speed of about ninety five to one hundred ten miles per hour (95-110 mph). The time that the air bubble is building up and collapsing is known as the transition time.

There is a need for a new catamaran design that substantially reduces or eliminates the transition time. By increasing the size of the aka, the vaka should begin to rise from the water at a lower speed and rise to the surface of the water at a lower speed as well. Even if the transition time is not completely eliminated, the bucking and kicking of the craft during the transition time would thereby be reduced.

Moreover, a transition time that begins and ends at lower speeds increases the efficiency of the craft, i.e., getting into the smooth portion of the ride, where the vaka have risen to the water surface, as soon as possible provides a great advantage in racing events and increases the comfort of the passenger or passengers as well due to the reduction or elimination of the transition time.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a catamaran that can transition from a water-buoyant craft to an air-bubble-supported craft in a minimal amount of time is now met by a new, useful, and non-obvious invention.

The inventive structure is a catamaran adapted for high speed travel. It includes a first vaka, a second vaka disposed parallel to the first vaka in transversely spaced apart relation thereto, and an aka that interconnects the first and second vakas to one another.

A first air tube of elongate extent is formed in the first vaka on an interior side thereof. A second air tube of elongate extent is formed in the second vaka on an interior side thereof in transversely spaced apart, parallel relation to the first air tube.

The first air tube is in open communication with a leading end of the first vaka and the second air tube is in open communication with a leading end of the second vaka.

The first air tube has a constant, uniform depth from the leading or bow end of the first vaka to a point on the first vaka remote from the leading end that is located at or near the center of gravity of the catamaran. From the center of gravity to the stern, the depth of the first air tube gradually decreases until there is no first air tube. The rate of depth decrease may vary from boat to boat. In some boats, therefore, the first air tube may merge with the inner sidewall of the first vaka at the stern, just slightly forward of the stern, or any number of feet forward of the stern but rearward of the center of gravity.

The second air tube has the same structure, i.e., it has a constant, uniform depth from the leading or bow end of the second vaka to a point on the second vaka remote from the leading end that is located at or near the center of gravity of the catamaran. From the center of gravity to the stern, the depth of the second air tube gradually decreases until there is no second air tube. In some boats, therefore, the second air tube may merge with the inner sidewall of the second vaka at the stern, just slightly forward of the stern, or any number of feet forward of the stern but rearward of the center of gravity.

Each air tube is disposed in transversely spaced apart relation to its counterpart. The presence of each air tube increases the volume of air that can enter the aka vis a vis a conventional aka bounded on its sides by conventional vakas. At the center of gravity of the watercraft, the gradually decreasing depths of the air tubes gradually compresses the air flowing toward the exit of the aka at the stern. The area from the center of gravity to the exit opening at the stern is known as the exhaust area.

This airflow through the aka causes lift of the craft at its center of gravity so that the nose or bow and the stern lift together. Advantageously, the lift of the vakas from their buoyant mode to their surface skimming mode begins at a relatively low speed and ends when the craft attains about eighty miles per hour (80 mph). This substantially reduces the transition time. Changes in the depth of the air tubes and the rate of decrease in said depth, to be determined by empirical studies, may lead to elimination or substantial elimination of the transition time.

In other words, each of the first and second vakas is thickened inwardly towards an opposing vaka to create a constriction in air flow beneath the aka. The thickening begins substantially at the center of gravity and increases toward the stern.

The aka has an aerodynamic bulbous nose that is flanked by scalloped or dished concave parts that extend from the bulbous nose to a leading end of a contiguous vaka. The bulbosity extends in a forward direction relative to a path of travel of the catamaran, and further includes a vertically downward part. An upper wall of the bulbosity is convex and said convex wall or surface gradually flattens and joins a flat top surface of the aka. The bulbous downward wall or surface also gradually flattens and joins a flat bottom surface of the aka. All parts of the bulbosity are integrally formed with one another and with the aka.

An important advantage of the invention is that the stern and bow of the catamaran lift evenly with one another as the vakas make the transition from buoyancy/flotation devices to stability-providing/water surface-riding devices.

Another advantage is that the length of time required to make said transition is substantially reduced vis a vis the length of time required to make the transition in a conventional catamaran.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 6 is a sectional view taken along line 6-6 in FIG. 3;

FIG. 7 is a sectional view taken along line 7-7 in FIG. 3;

DETAILED DESCRIPTION OF THE PREFERRED EMBODIMENT

Figure 1:
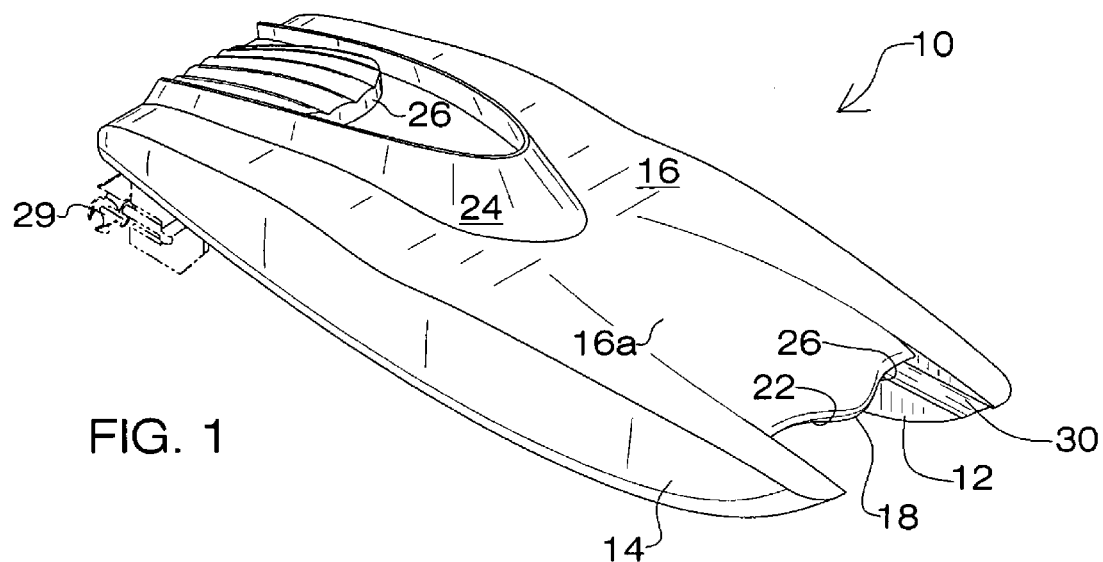
FIG. 1 is a perspective view of the novel catamaran taken from above and forwardly thereof.
Figure 2:
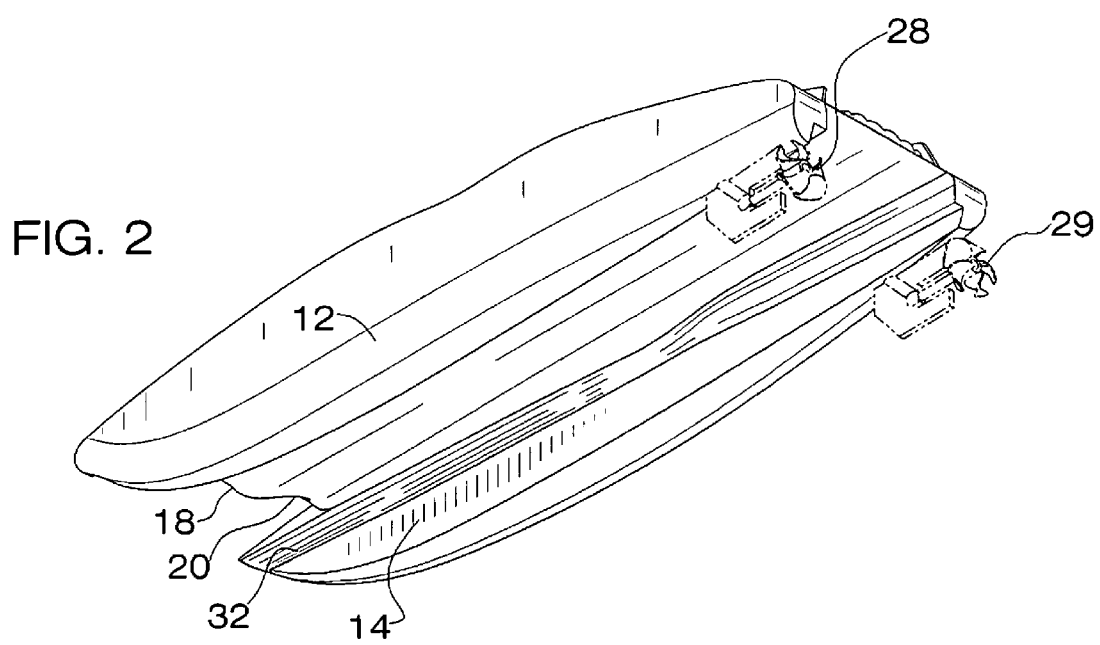
FIG. 2 is a perspective view of the novel catamaran taken from below and rearwardly thereof.

Referring now to FIGS. 1 and 2, it will there be seen that an illustrative embodiment of the invention is denoted as a whole by the reference numeral 10.

Catamaran 10 has a first vaka 12, a second vaka 14, and an aka 16 that interconnects said first and second vakas.

Figure 3:
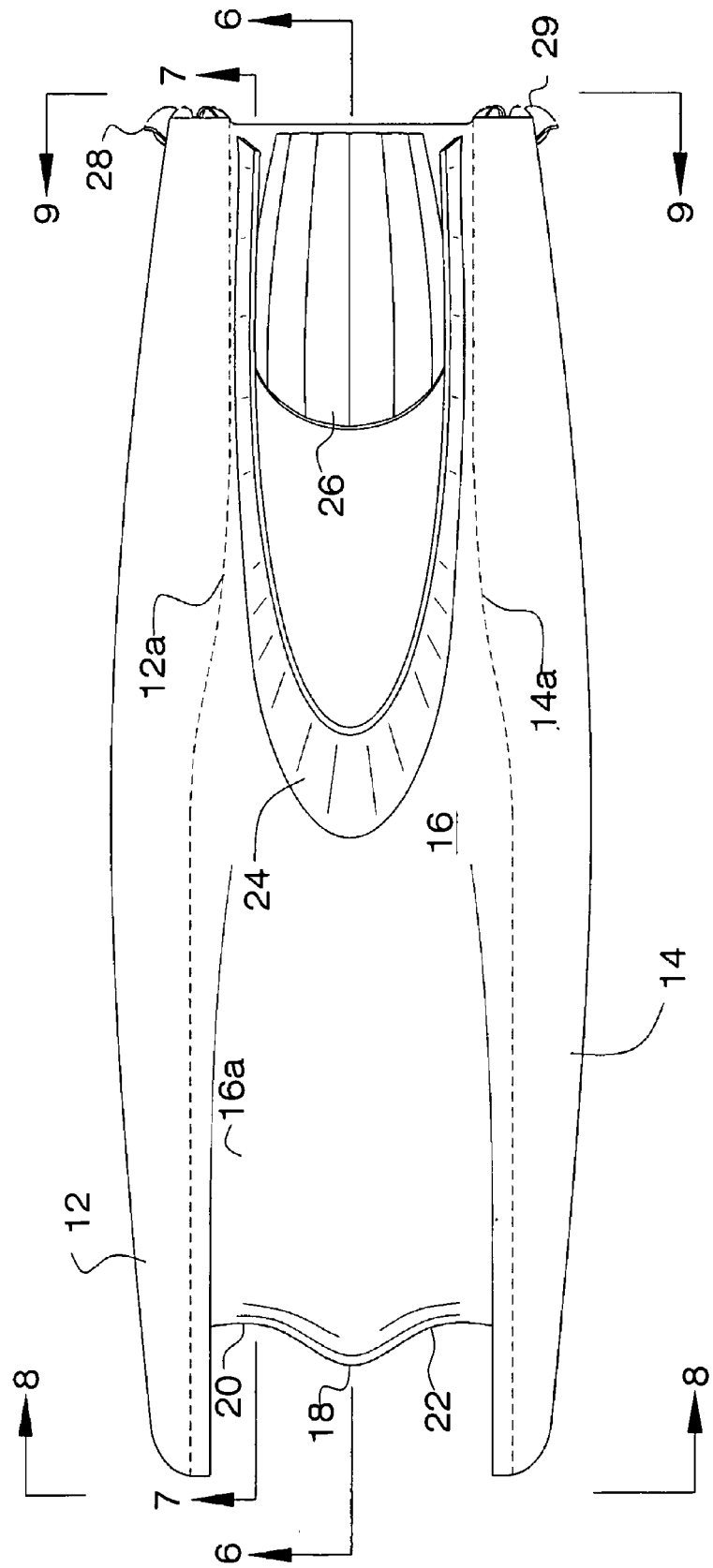
FIG. 3 is a top plan view thereof.
Figure 9:
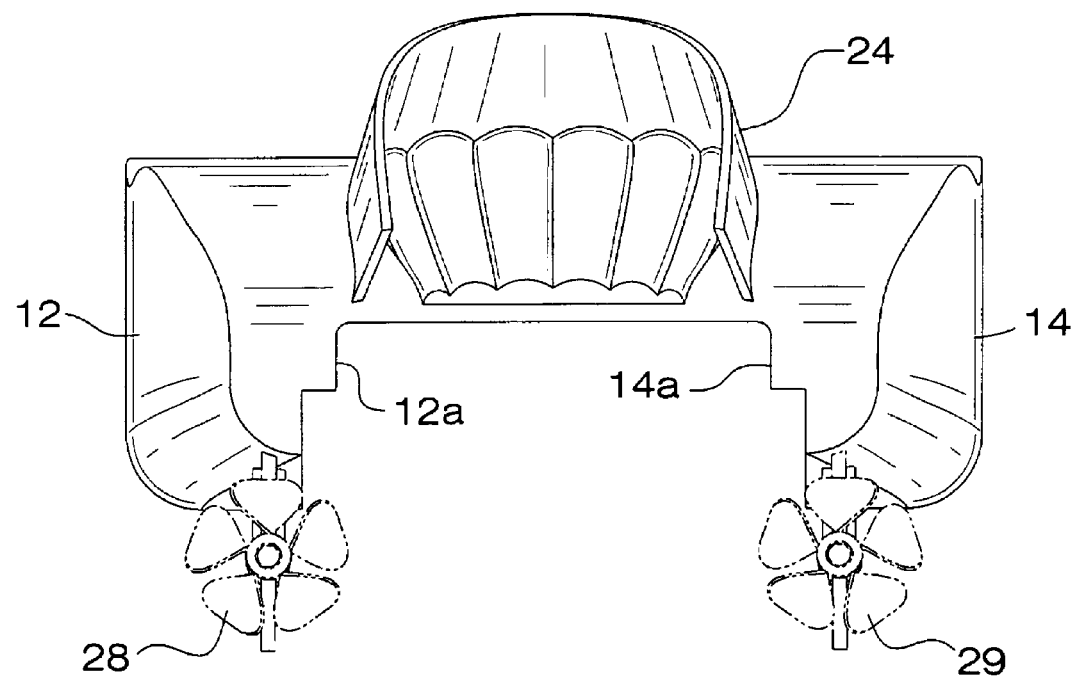
FIG. 9 is a rear end view taken along line 9-9 in FIG. 3.

Aka 16 has bulbous nose 18 flanked by scalloped or dished concave parts 20, 22. The bulbosity extends in a forward or bow direction as depicted. It also has a top convex wall or surface 18a and a downwardly extending wall or surface 18b as best understood in connection with FIG. 9. Convex upward surface 18a gradually flattens out and joins flat top surface of aka 16 at 16a as depicted in FIGS. 1 and 3. Bulbous lower surface 18b gradually flattens out and joins and flat bottom surface of aka 16.

Windscreen 24 is essentially conventional, as are engine 26, propellers 28, 29, and the means for interconnecting the respective output shafts of the engines to their respective propeller shafts.

First elongate tubular air tube 30 is formed in first vaka 12 on the interior side thereof and second elongate tubular air tube 32 is formed in second vaka 14 on the interior side thereof in transversely spaced apart relation from said first air tube. Each air tube is flush with the leading or bow end of the vaka within which it is formed as is clear from FIGS. 1 and 2.

Figure 4:
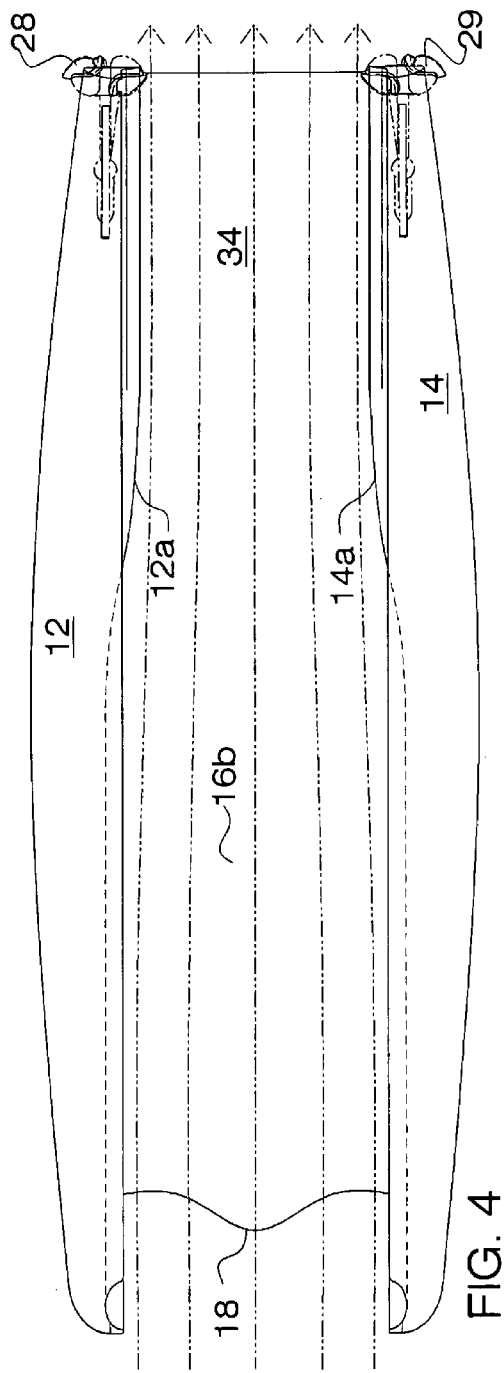
FIG. 4 is a bottom plan view thereof.
Figure 5:
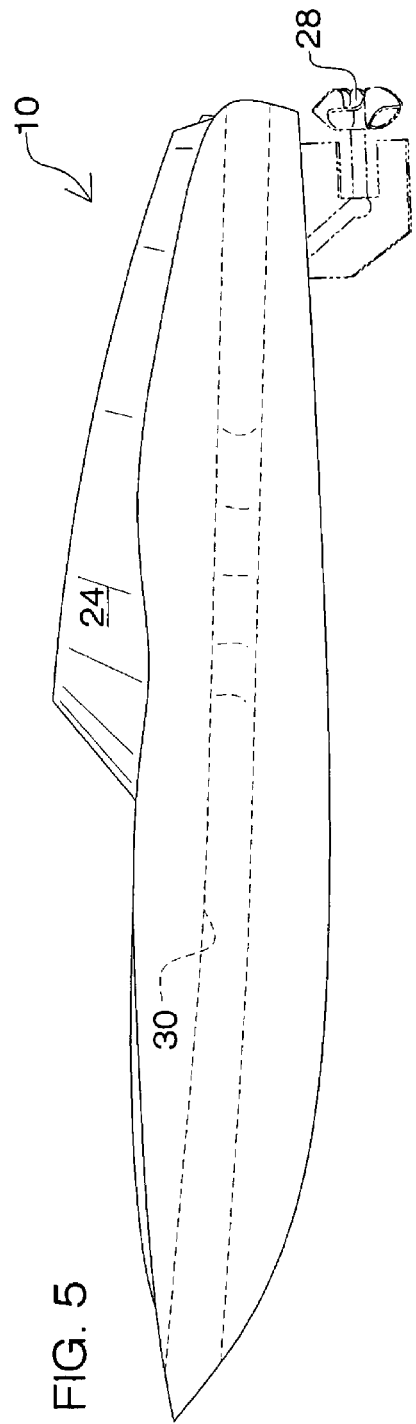
FIG. 5 is a side elevational view thereof.
Figure 8:
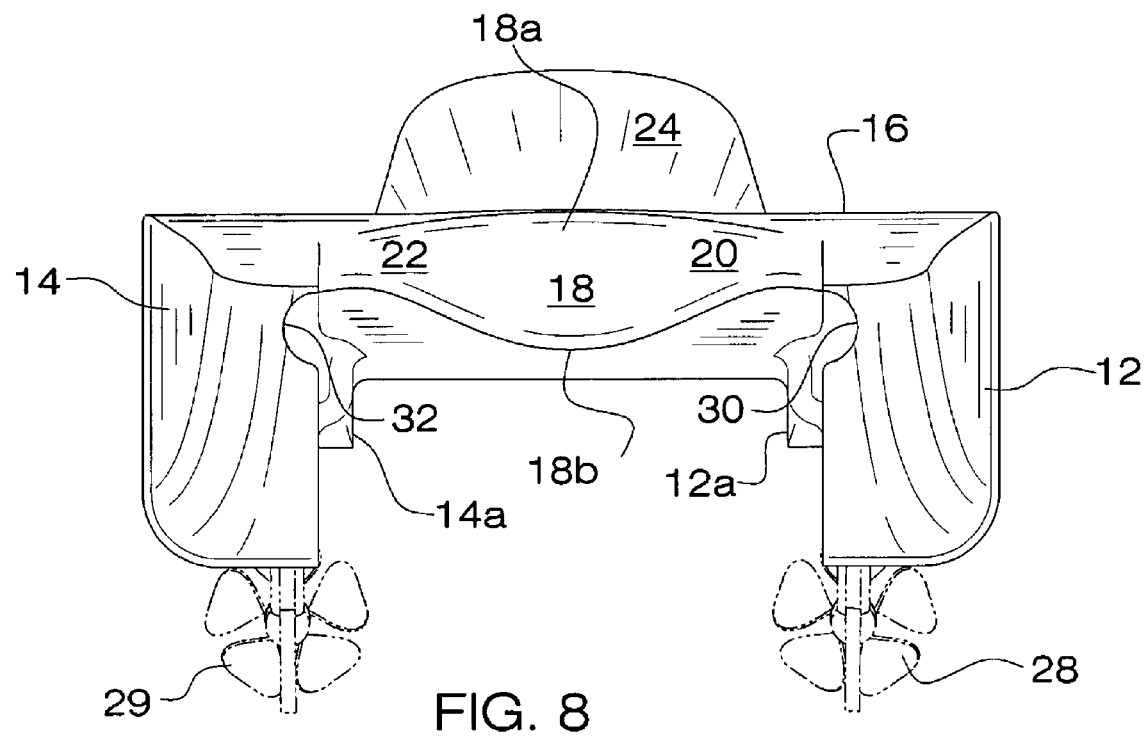
FIG. 8 is a front end view taken along line 8-8 in FIG. 3.

As best depicted in FIGS. 2, 3 and 4, the depth of each air tube is constant or uniform from the leading end of its associated vaka until it reaches the approximate center of gravity of the watercraft. The depth of each air tube begins at said approximate center of gravity to gradually lessen at a predetermined rate as it approaches the stern. The rate of depth decrease varies between designs. Therefore, the first air tube formed in the first vaka may decrease gradually so that the air tube has no depth at the stern. Said depth may decrease more rapidly so that the air tube has no depth just forwardly of the stern or any number of feet forward of the stern but rearward of the center of gravity. The depth of the second air tube formed in the second vaka matches the depth of its counterpart so that stern or rear-flowing air is symmetrically compressed.

The center of gravity is typically about two-thirds to three-fourths of the distance from the bow to the stern.

In other words, each vaka is gradually thickened in a lateral direction towards its opposing vaka as depicted in FIGS. 2-4, i.e., beginning at about the location of the center of gravity and extending to the stern. The respective bulges created by such thickening are denoted 12a, 14a.

The area from bulges 12a, 14a to the stern is exhaust area 34.

Bulges 12a, 14a create a constriction so that the flow rate of air flowing under aka 16 and in both air tubes 30, 32 increases as said air flows into constricted exhaust area 34. Since the volume of air entering the space under aka 16 at the bow of the craft must be the same volume leaving the space under aka 16 at the stern, the flow rate of air as it flows through constricted exhaust area 34 is greater than the flow rate entering the space below aka 16 at the bow. The resultant effect is a relatively quick rise of the vakas from their flotation position to their water surface-riding position.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A catamaran adapted for high speed travel, comprising:
a first vaka;
a second vaka disposed parallel to said first vaka in transversely spaced apart relation thereto;
an aka that interconnects said first and second vakas to one another;
a first air tube of elongate extent formed in said first vaka on an interior side thereof;

a second air tube of elongate extent formed in said second vaka on an interior side thereof in transversely spaced apart relation from said first air tube;

said first air tube being in open communication with a leading end of said first vaka;

said second air tube being in open communication with a leading end of said second vaka;

said first air tube having a predetermined uniform depth from said leading end of said first vaka to a point that is approximately where said catamaran has a center of gravity;

said first air tube gradually lessening in depth at a predetermined rate as measured in a direction from said approximate center of gravity to said stern, said predetermined rate causing said first air tube to have no depth when it merges with an inner sidewall of said first vaka at a location between said stern and rearward of said center of gravity;

said second air tube having a predetermined uniform depth from said leading end of said second vaka to a point that is approximately where said catamaran has a center of gravity; and said second air tube gradually lessening in depth at a predetermined rate as measured in a direction from said approximate center of gravity to said stern, said predetermined rate causing said second air tube to have no depth when it merges with an inner sidewall of said second vaka at a location between said stern and rearward of said center of gravity.

2. The catamaran of claim 1, further comprising:

each of said first and second vakas being thickened inwardly toward an opposing vaka to create a constriction in air flow beneath said aka, said thickening being gradual and beginning substantially at said approximate center of gravity and increasing to said stern, said thickening being a result of said gradual lessening in depth of said first and second air tubes;

an exhaust area that begins where said constriction begins and that extends to said stern;

said air flowing through said exhaust area having a flow rate that exceeds a flow rate of air entering into said space below said aka at the bow of said catamaran.

3. The catamaran of claim 1, further comprising:

said aka having a bulbous nose extending in a forward direction relative to a path of travel of said catamaran;

said bulbous nose being flanked by concave scalloped parts that extend from said bulbous nose to a contiguous vaka.

4. The catamaran of claim 3, further comprising:

said bulbous nose also having a convex upper surface that gradually flattens and merges with a top surface of said aka.

5. The catamaran of claim 3, further comprising:

said bulbous nose having a downwardly extending bulbous surface that gradually flattens and merges with a bottom surface of said aka.

\* \* \* \* \*